United States Patent
Mincu et al.

(10) Patent No.: US 11,933,246 B2
(45) Date of Patent: Mar. 19, 2024

(54) TURBOJET ENGINE COMPRISING A NACELLE WITH AN AIR INTAKE TO PROMOTE A REVERSED THRUST PHASE

(71) Applicant: SAFRAN AIRCRAFT ENGINES, Paris (FR)

(72) Inventors: Daniel-Ciprian Mincu, Moissy-Cramayel (FR); Jean-Loïc Hervé Lecordix, Moissy-Cramayel (FR); Nicolas Joseph Sirvin, Moissy-Cramayel (FR); Frédéric Dautreppe, Moissy-Cramayel (FR); Anthony Binder, Moissy-Cramayel (FR); Eva Julie Lebeault, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 72 days.

(21) Appl. No.: 17/600,071

(22) PCT Filed: Apr. 8, 2020

(86) PCT No.: PCT/EP2020/060028
§ 371 (c)(1),
(2) Date: Sep. 29, 2021

(87) PCT Pub. No.: WO2020/212224
PCT Pub. Date: Oct. 22, 2020

(65) Prior Publication Data
US 2022/0186682 A1    Jun. 16, 2022

(30) Foreign Application Priority Data

Apr. 17, 2019   (FR) ...................................... 1904087

(51) Int. Cl.
*F02K 1/62*   (2006.01)

(52) U.S. Cl.
CPC ..................................... *F02K 1/62* (2013.01)

(58) Field of Classification Search
CPC ..... F02K 1/62; F02K 1/64; F02K 1/66; F02K 1/76
See application file for complete search history.

(56) References Cited

U.S. PATENT DOCUMENTS 3,623,328 A * 11/1971 Pike ........................ F02C 7/045
                                                          60/216
3,729,934 A *  5/1973 Denning ................... F02K 1/66
                                                          415/130

(Continued)

FOREIGN PATENT DOCUMENTS

EP           0516468 A2   12/1992
EP           3002210 A1    4/2016
(Continued)

OTHER PUBLICATIONS

Search Report from the French Intellectual Property Office on corresponding FR application (FR1904087) dated Nov. 27, 2019.

(Continued)

*Primary Examiner* — Craig Kim
(74) *Attorney, Agent, or Firm* — KOS IP Law LLP

(57) ABSTRACT

An aircraft turbojet engine extending along an X axis and comprising a blower configured to provide a reverse thrust and a nacelle comprising an air intake which comprises at least one deflection member movably mounted between a deployed position in which the deflection member projects from the inner wall or from the lip of the air intake in a radially inward direction of deployment facing the X axis or in a longitudinal direction of deployment with respect to the X axis, in order to allow a release of the reverse air flow from the inner wall to support the reverse thrust phase, and a retracted position in which the air intake has an aerodynamic (Continued)

profile so as to guide the internal air flow along the inner wall in order to support the thrust phase.

11 Claims, 9 Drawing Sheets

(56) References Cited

U.S. PATENT DOCUMENTS

| | | | | | |
|---|---|---|---|---|---|
| 3,736,750 | A | * | 6/1973 | Britt | F02K 3/06 137/15.1 |
| 5,156,362 | A | * | 10/1992 | Leon | B64D 33/02 244/130 |
| 6,655,632 | B1 | * | 12/2003 | Gupta | B64C 23/06 244/1 N |
| 8,408,491 | B2 | * | 4/2013 | Jain | F02C 7/042 415/126 |
| 8,529,188 | B2 | * | 9/2013 | Winter | F02C 7/042 415/126 |
| 2016/0097290 | A1 | * | 4/2016 | Fulayter | B64D 33/02 415/182.1 |
| 2018/0100434 | A1 | * | 4/2018 | Dindar | F02C 7/057 |
| 2022/0170430 | A1 | * | 6/2022 | Binder | F02K 1/66 |

FOREIGN PATENT DOCUMENTS

| | | | | |
|---|---|---|---|---|
| GB | 1252193 | A | | 11/1971 |
| GB | 1565212 | A * | 4/1980 | B64C 11/001 |
| GB | 1565212 | A | | 4/1980 |

OTHER PUBLICATIONS

International Search Report and Written Opinion on corresponding PCT application (PCT/EP2020/060028) from International Searching Authority (EPO) dated May 28, 2020.

* cited by examiner

TURBOJET ENGINE COMPRISING A NACELLE WITH AN AIR INTAKE TO PROMOTE A REVERSED THRUST PHASE

TECHNICAL FIELD

The present invention relates to the field of aircraft turbojet engines and is more particularly directed to an air intake of an aircraft turbojet engine nacelle.

In a known manner, an aircraft comprises one or more turbojet engines to enable its propulsion by acceleration of an air flow that circulates from upstream to downstream in the turbojet engine.

With reference to FIG. 1, a turbojet engine 100 is represented, extending along an axis X and comprising a fan 101 rotatably mounted about axis X in an external shell 102 in order to accelerate, during a thrust phase of the turbojet engine 100, an air flow circulating from upstream to downstream in the turbojet engine 100, referred to as the internal air flow F-INT. Hereinafter, the terms "upstream" and "downstream" are defined with respect to the circulation of the internal air flow F-INT.

In a known manner, the turbojet engine 100 comprises a nacelle comprising at its upstream end an air intake 200 comprising an internal wall 201 pointing to axis X and an external wall 202 opposite to the internal wall 201. The walls 201, 202 are connected by an air intake lip 203, comprising a leading edge, so as to form an annular cavity 220. The air intake 200 has an aerodynamic profile for separating an upstream air flow F into the internal air flow F-INT guided by the internal wall 201 and an external air flow F-EXT guided by the external wall 202. Hereinafter, the terms "internal" and "external" are defined radially with respect to axis X of the turbojet engine 100.

In order to reduce braking distance of an aircraft, especially during landing, it is known to integrate in a nacelle a thrust reversal system for modifying the orientation of the air flow at the exhaust so as to perform a thrust reversal phase. In a known way, the thrust reversal phase is carried out by opening flaps and/or grids in the secondary stream, downstream of the straighteners, in order to lead back the air flow outwardly in a radial manner with respect to axis X or upstream.

For a high bypass ratio turbojet engine, the nacelle has a large diameter and it is not desired to integrate a conventional thrust reversal system since this would be significantly detrimental to the weight, overall size and drag of the turbojet engine.

To allow a thrust reversal phase, another solution consists in providing a Variable Pitch Fan, or VPF, so as to make it possible to reverse the air flow circulating in the secondary stream of a turbojet engine and thus create a thrust reversal phase allowing the aircraft to decelerate during landing or during any other maneuver.

With reference to FIG. 2, during a thrust reversal phase, a reverse air flow F-INV circulates from downstream to upstream in the turbojet engine 100, that is, reversely to the internal air flow F-INT of FIG. 1. More precisely, the reverse air flow F-INV circulates in the vicinity of the external shell 102 and is then guided upstream by the internal wall 201 in a direction that is substantially axial with respect to axis X. This reverse air flow F-INV then opposes the upstream air flow F, thereby allowing the thrust reversal phase.

In practice, as illustrated in FIG. 2, part of the reverse air flow F-INV bypasses the aerodynamic profile of the air intake 200 along a substantially radial direction, which leads to the occurrence of a local depression zone P in the vicinity of the air intake lip 203. Such a local depression P generates an upstream suction, that is, a force that opposes the thrust reversal phase. In practice, this phenomenon very significantly reduces the thrust reversal phase.

The invention thus aims to reduce this phenomenon in order to increase the performance of the turbojet engine during the thrust reversal phase without affecting the performance of said aircraft during the thrust phase, that is in a non-reversed flow configuration.

In prior art, from patent applications EP3421373A1 and U.S. Pat. No. 3,770,228A1, an air intake comprising one or more outwardly pivoting members to prevent the internal air flow from becoming detached from the internal wall under unfavorable operating conditions, especially during takeoff is known. Such members do not favor the thrust reversal phase.

From U.S. Pat. No. 3,736,750A1, an air intake comprising ring portions movable between a cruise, takeoff and landing position, in order to reduce noise emitted is also known.

In the remote field of hovercraft, from patent application GB 1565212A, a propeller mounted in a fairing whose upstream end shape is changeable by virtue of an inflatable member is also known.

SUMMARY

The invention relates to an air intake of an aircraft turbojet engine nacelle extending along an axis X oriented from upstream to downstream in which an internal air flow circulates from upstream to downstream during a thrust phase and a reverse air flow from downstream to upstream during a thrust reversal phase, the air intake circumferentially extending about axis X and comprising an internal wall pointing to axis X and configured to guide the internal air flow and the reverse air flow and an external wall, opposite to the internal wall, and configured to guide an external air flow, the internal wall and the external wall being interconnected by an air intake lip so as to form an annular cavity.

The invention is remarkable in that the air intake comprises a deflection device comprising at least one deflection member movably mounted between an extended position, in which the deflection member projectingly extends from the internal wall or the air intake lip in a radially internal extension direction pointing to axis X or a longitudinal extension direction with respect to axis X, in order to allow the reverse air flow to be separated from the internal wall to promote the thrust reversal phase, and a retracted position, in which the air intake has an aerodynamic profile so as to guide the internal air flow over the internal wall to promote the thrust phase.

By virtue of the invention, the reverse air flow is separated from the internal wall, thus preventing the reverse air flow from bypassing the lip and limiting the local depression generated compared to prior art, and thus the force opposing the reverse thrust induced. Furthermore, the performance of the turbojet engine during the thrust phase is not reduced. A radially inward extension allows the reverse air flow to be acted upon before it comes into contact with the air intake lip.

Preferably, the deflection member is rigid. A rigid member opposes to an elastic envelope.

According to a preferred aspect, the extension direction is oriented upstream, in order to promote separation without reducing forces involved in the reverse air flow. Alternatively, the extension direction is oriented downstream.

Preferentially, the annular cavity extending along a longitudinal direction X20 substantially parallel to axis X and the extension direction forming an extension angle with respect to the longitudinal direction X20, the extension angle is between 90° and 140°, in order to promote separation without reducing forces involved in the reverse air flow.

Preferably, the direction of extension is a function of the level of reverse thrust desired.

According to a preferred aspect, the deflection device comprises a plurality of deflection members circumferentially distributed over the circumference of the air intake about axis X, to reduce drag.

Preferably, the deflection device comprises at least one row comprising a plurality of deflection members at the same radial distance from axis X, in order to generate separation around the entire circumference of axis X.

Preferentially, the deflection device comprises a plurality of rows each comprising a plurality of deflection members at the same radial distance from axis X, to promote separation of the reverse air flow.

Preferentially, the rows are circular having axis X.

Preferentially, the rows are staggered so as to reduce weight and drag while promoting reverse air flow separation over the entire circumference of the air intake. Preferably, the deflection members partially overlap along the azimuthal direction.

According to another preferred aspect, the deflection device comprises a single deflection member circumferentially extending about axis X, ensuring homogeneous or heterogeneous separation of the reverse air flow over the entire circumference of the air intake lip.

According to a preferred aspect, at least one deflection member is rotatably hinged between the extended position and the retracted position, allowing easy and quick switching from one position to the other.

Preferably, the internal wall comprises a concave housing configured to receive the deflection member in the retracted position, so that the air intake has an aerodynamic profile identical to that of prior art so as not to reduce the performance of the turbojet engine during the thrust phase.

According to another preferred aspect, at least one deflection member is translationally movably mounted along the extension direction between the extended position and the retracted position, allowing easy and quick switching from one position to the other.

Preferably, at least one deflection member is polygonal or cylindrical in shape in order to promote aerodynamics of the lip during the thrust reversal phase in order to increase the performance of the aircraft during the thrust reversal phase.

According to a preferred aspect, the deflection device comprises at least one controllable active moving member in order to move the deflection member from the retracted position to the extended position in a simple and quick manner.

Preferentially, the controllable active moving member moves the deflection member from the extended position to the retracted position, allowing movement from one position to the other in both directions in a simple and quick manner.

According to another preferred aspect, the deflection device comprises at least one passive moving member configured to move the deflection member from the retracted position to the extended position under the action of the reverse air flow, not requiring an additional power supply to be provided by the aircraft. The deflection member is autonomous.

Preferentially, the deflection member is configured to be moved from the extended position to the retracted position under the action of the internal air flow, not requiring an additional power supply to be provided by the aircraft.

Preferably, the deflection device comprises a cover member movably mounted between a covered position, in which the cover member covers the deflection member in the retracted position so as to provide an aerodynamic profile, and an uncovered position, in which the cover member is offset from its covered position so that the deflection member is in the extended position. The cover member acts as an extension of the internal wall during the thrust phase, thereby allowing the air intake to maintain its aerodynamic profile and thus the aircraft not to reduce its performance during the thrust phase.

The invention also relates to an aircraft turbojet engine extending along an axis X oriented from upstream to downstream, in which an internal air flow circulates from upstream to downstream during a thrust phase and a reverse air flow from downstream to upstream during a thrust reversal phase, the turbojet engine comprising a fan configured to provide reverse thrust and a nacelle comprising an air intake, as previously set forth, so as to promote said thrust reversal phase. Preferably, the fan comprises variable pitch blades.

The invention further relates to a method for operating an air intake as previously set forth, in which at least one deflection member is in a retracted position during a thrust phase of the turbojet engine so that the air intake has an aerodynamic profile so as to guide the flow of internal air over the internal wall, the method comprising, during a thrust reversal phase of said turbojet engine a step of moving the deflection member into an extended position so that said deflection member projectingly extends from the internal wall or the air intake lip in a radially internal extension direction pointing to axis X or a longitudinal extension direction with respect to axis X, so as to allow the reverse air flow to be separated from the internal wall in order to promote the thrust reversal phase.

An air intake can thus be used efficiently during both a thrust phase and a thrust reversal phase. Further, the deflection member can be moved conveniently and quickly. In addition, the number of deflection members, their shape, arrangement and movement allow the deflection device to adapt to different operating conditions, such as braking.

BRIEF DESCRIPTION OF THE DRAWINGS

The invention will be better understood upon reading the following description, given only by way of example, and referring to the appended drawings given as non-limiting examples, in which identical references are given to similar objects and in which.

It should be noted that the figures set out the invention in detail to implement the invention, said figures of course being able to be used to better define the invention if necessary.

DETAILED DESCRIPTION

Figure 1:
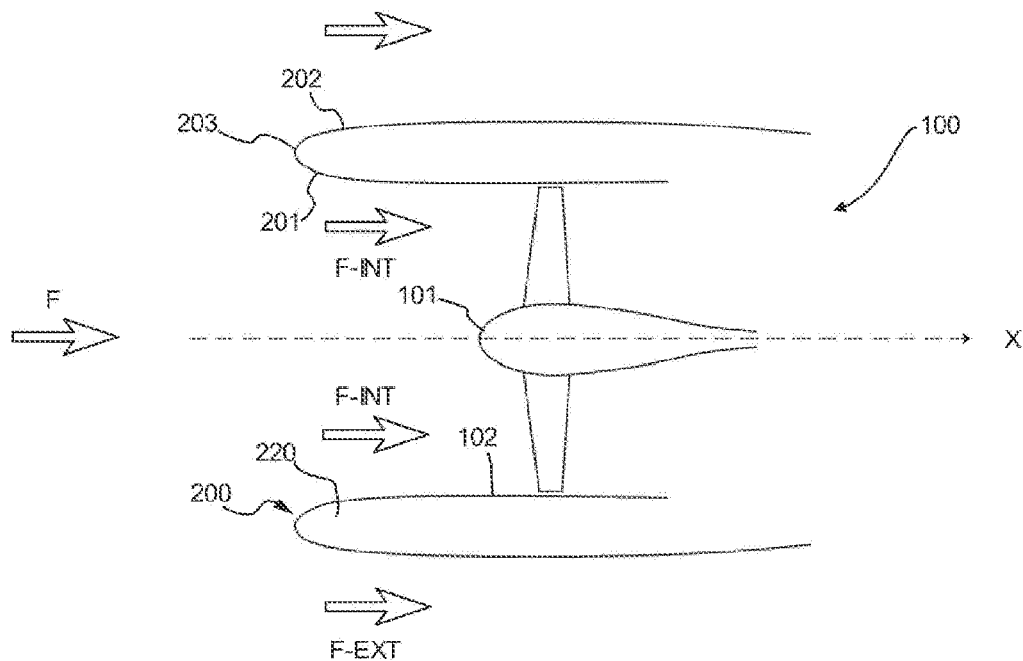
FIG. 1 is a schematic representation in a longitudinal cross-section view of a turbojet engine nacelle in thrust phase, according to prior art.
Figure 2:
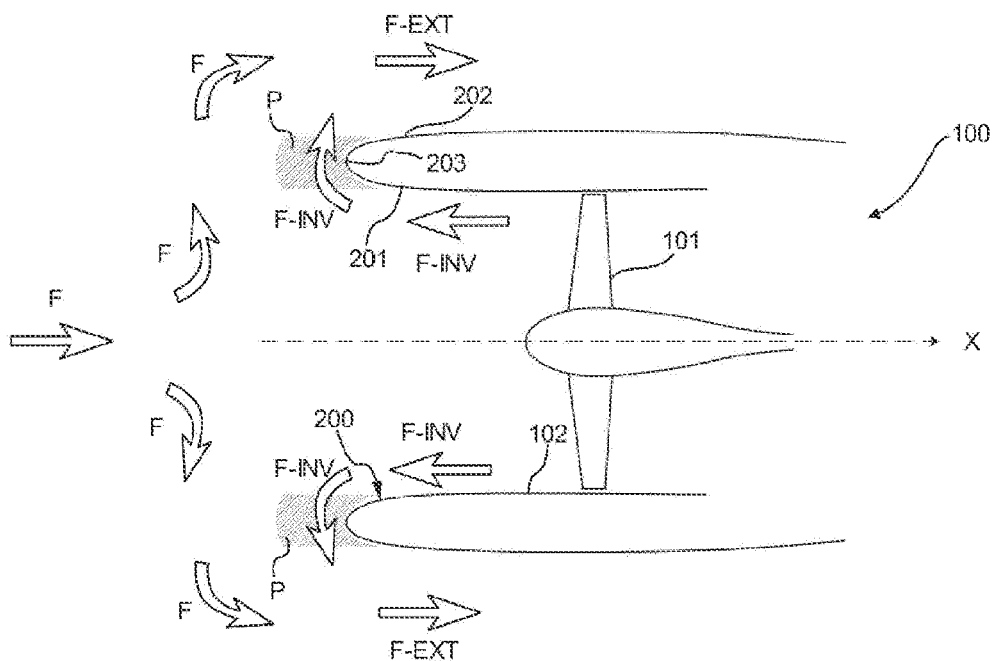
FIG. 2 is a schematic representation in a longitudinal cross-section view of a turbojet engine nacelle in thrust reversal phase, according to prior art.
Figure 3:
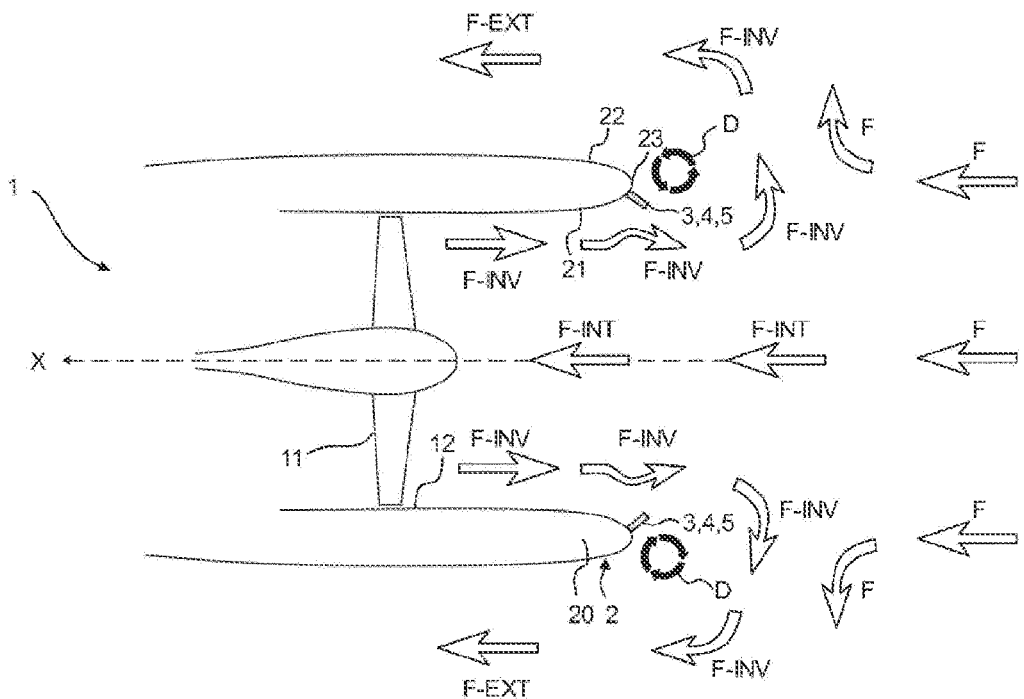
FIG. 3 is a schematic representation in a longitudinal cross-section view of a turbojet engine nacelle in the thrust reversal phase, according to the invention.

With reference to FIG. 3, a turbojet engine 1 according to the invention is represented, extending along an axis X oriented from upstream to downstream and comprising a fan 11 rotatably mounted about axis X in an external shell 12 defining an air stream. In a known manner, the fan 11 is configured, during a thrust phase, to accelerate an air stream circulating from upstream to downstream in the turbojet engine 1, known as the internal air flow F-INT, and during a thrust reversal phase, to accelerate an air flow circulating from downstream to upstream in the turbojet engine 1, known as the reverse air flow F-INV.

In practice, as illustrated in FIG. 3, the reverse air flow F-INV circulates from downstream to upstream in a radially external portion of the air stream, in particular, over ⅓ of the radius of the air stream. An internal air flow F-INT always circulates from upstream to downstream in a radially internal portion of the air stream, in particular, over ⅔ of the air stream radius. The internal air flow F-INT ensures a sufficient flow rate to avoid any pumping phenomenon of the turbojet engine.

As illustrated in FIG. 3, the turbojet engine comprises a nacelle which comprises at its upstream end an air intake 2 circumferentially extending about axis X and comprising an internal wall 21, pointing to axis X and configured to guide the internal air flow F-INT and the reverse air flow F-INV, and an external wall 22, opposite to the internal wall 21 and configured to guide an external air flow F-EXT. The internal wall 21 and the external wall 22 are connected by an air intake lip 23 comprising a leading edge. The walls 21, 22 and the air intake lip 23 form an annular cavity 20 extending along a longitudinal direction parallel to axis X. Within the annular cavity 20, a sound attenuation device or a de-icing device may especially be mounted.

In this example, the turbojet engine 1 comprises thrust reversal means, in particular a variable pitch fan 11, or VPF, for reversing the air flow circulating in the turbojet engine 1 and thus to create a thrust reversal phase allowing the aircraft to decelerate during landing, or during any other maneuver.

According to the invention, with reference to FIG. 3, the air intake 2 comprises a deflection device comprising one or more deflection members 3, 4, 5 movably mounted between an extended position, adapted to improve thrust reversal, and a retracted position adapted to improve the thrust phase. Advantageously, in the extended position, the deflection member 3, 4, 5 projectingly extends from the internal wall 21 or the air intake lip 23 along a radially internal extension direction pointing to axis X or a longitudinal extension direction with respect to axis X, in order to allow a separation D of the reverse air flow F-INV from the internal wall 21 to favor the thrust reversal phase as illustrated in FIG. 3.

With reference to FIG. 3, preferably, in the extended position, the deflection member 3, 4, 5 projectingly extends from the internal wall 21 with respect to axis X. Advantageously, the deflection member 3, 4, 5 deflects the reverse air flow F-INV guided by the internal wall 21 in order to generate a separation D. In other words, the entire reverse air flow F-INV is guided so as to circulate in a substantially axial direction with respect to axis X in order to oppose an upstream air flow F, originating the thrust reversal phase. Preferably, as the extension direction forms an extension angle with respect to the longitudinal direction of the annular cavity 20, the extension angle of the deflection member 3, 4, 5 is between 90° and 140°. It is thus chosen to be sufficiently small to promote separation D and sufficiently large so as not to significantly reduce forces involved in the reverse air flow F-INV. It goes without saying, however, that the extension angle can be different, depending on the desired level of thrust reversal. In particular, the deflection member 3, 4, 5 may also projectingly extend downstream.

Hereinafter, a single deflection device is presented, but it goes without saying that the air intake 2 could comprise a plurality of deflection devices.

Figure 4:
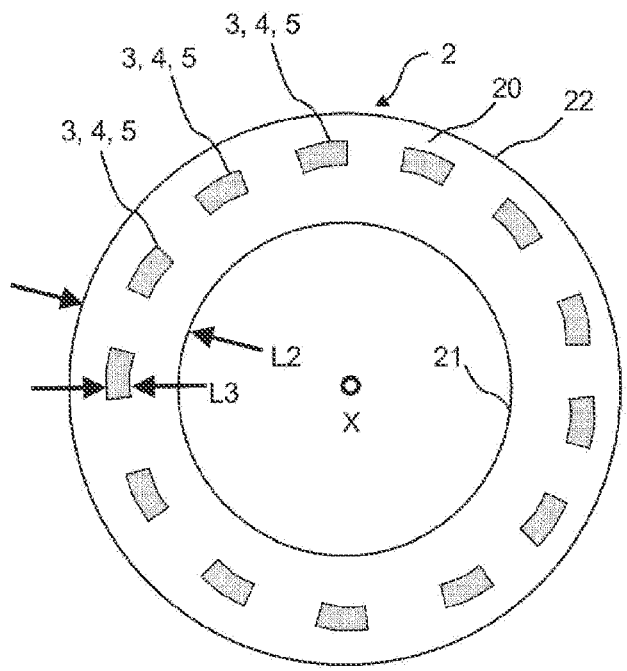
FIG. 4.

With reference to FIG. 4, a deflection device is represented, comprising several deflection members 3, 4, 5 which are distributed over the circumference of the air intake 2 about axis X in such a way as to enable the thrust reversal phase to be improved over the entire said circumference. In a preferred manner, with reference to FIG. 4, the azimuthal length of a deflection member 3, 4, 5 is such that these surfaces are of a low overall size, light and are easily extendable. Naturally, the azimuthal length may vary from one deflection member 3, 4, 5 to another, in order to adapt to different operating conditions, such as braking, and especially to cope with inhomogeneous air flow over the circumference of the air intake lip. Preferably, the azimuthal spacing between two consecutive deflection members 3, 4, 5 is sufficiently small so that the deflection members 3, 4, 5 cover a maximum azimuthal surface area when extended, or even partially overlap in the extended position. Preferably, the number of deflection members 3, 4, 5 is large enough to allow for a separation D over the entire circumference of the air intake 2 and small enough to reduce weight and drag.

Figure 5:
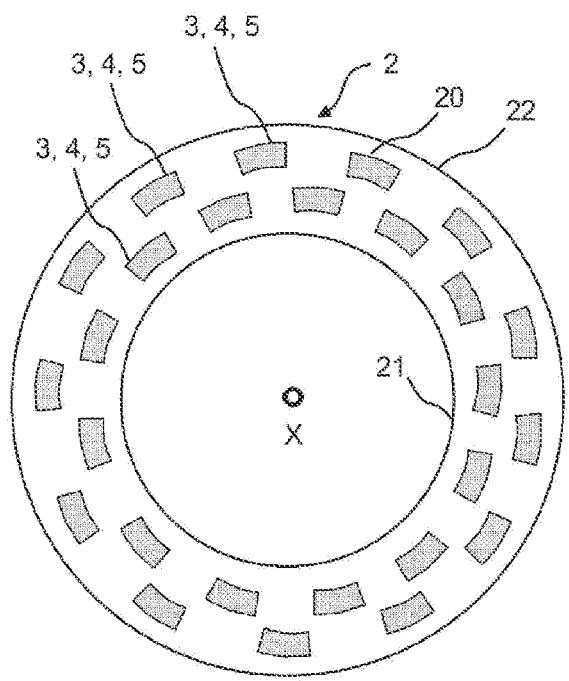
FIG. 5 are a schematic representation in a transverse cross-section view of an air intake comprising a deflection device comprising one or two rows.

Preferably, the deflection members 3, 4, 5 are organized as rows. Preferably, each row comprises a plurality of deflection members 3, 4, 5 at a same radial distance from axis X. In other words, a row is circular in shape. By way of example, a single circular row is represented in FIG. 4 and two circular rows in FIG. 5, but it goes without saying that the number of rows could be higher. The use of several rows, in particular staggered rows as illustrated in FIG. 5, allows a substantially continuous deflection to be achieved along the circumference of the air intake 2 while using deflection members 3, 4, 5 spaced apart from each other that are easier to maintain. In particular, the deflection members 3, 4, 5 may partially overlap in a scale-like manner to form a deflection continuity at the circumference of the air intake 2.

Preferably, with reference to FIG. 4, the ratio L3/L2, where parameter L3 is the radial thickness of a deflection member 3, 4, 5 and parameter L2 is the radial thickness of the air intake 2, is between 0.05 and 0.3.

Figure 6:
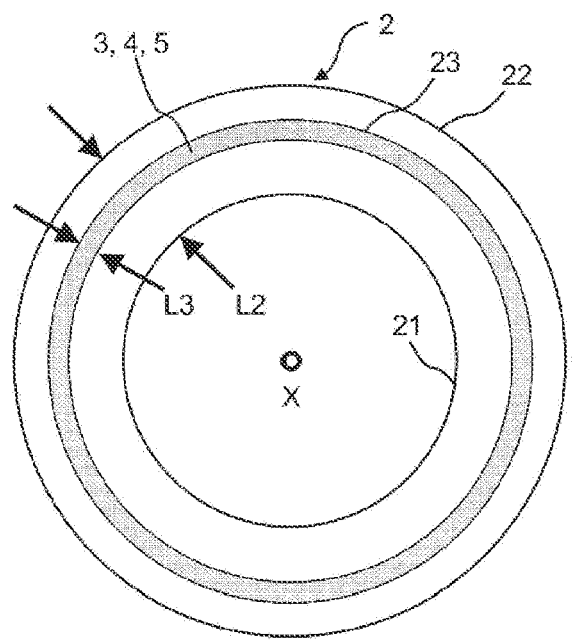
FIG. 6 is a schematic representation in a transverse cross-section view of an air intake comprising a deflection device with a circumferential deflection member.

Alternatively, with reference to FIG. 6, the deflection device comprises a single deflection member 3, 4, 5 circumferentially extending about axis X. Such a deflection member 3, 4, 5 is for ensuring deflection over the entire circumference of the air intake 2, during the thrust reversal phase.

Preferably, the deflection members 3, 4, 5 extend in the vicinity of the air intake lip 2 on the side of the internal wall 21 so as to avoid formation of a local depression zone.

Preferably, the material of a deflection member 3, 4, 5 is rigid so as to effectively improve the thrust reversal phase. Preferentially, this material is identical to that of the internal wall 21 and/or the external wall 22.

The invention will be better understood when describing the different embodiments. The different aspects of the invention are described hereinafter according to three embodiments, set forth successively and solely by way of example. It goes without saying that the invention is not limited to these three embodiments but encompasses any possible combination of the various technical characteristics of the embodiments set forth.

Figure 7A:
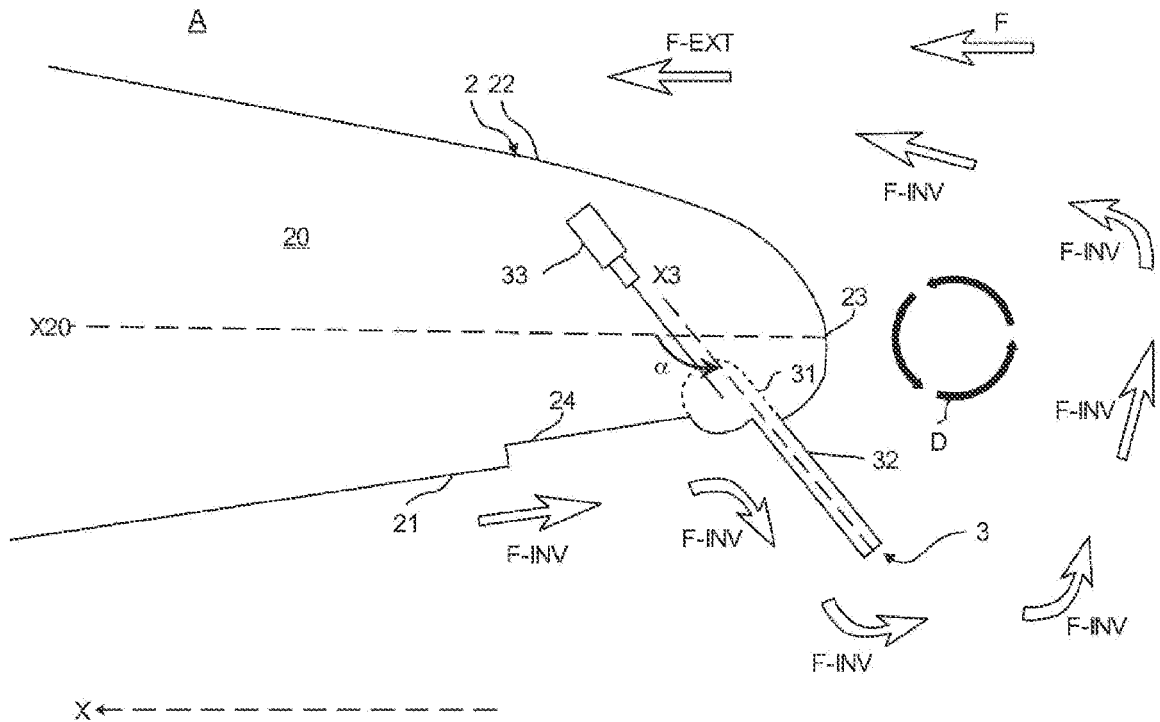
FIG. 7A.
Figure 7B:
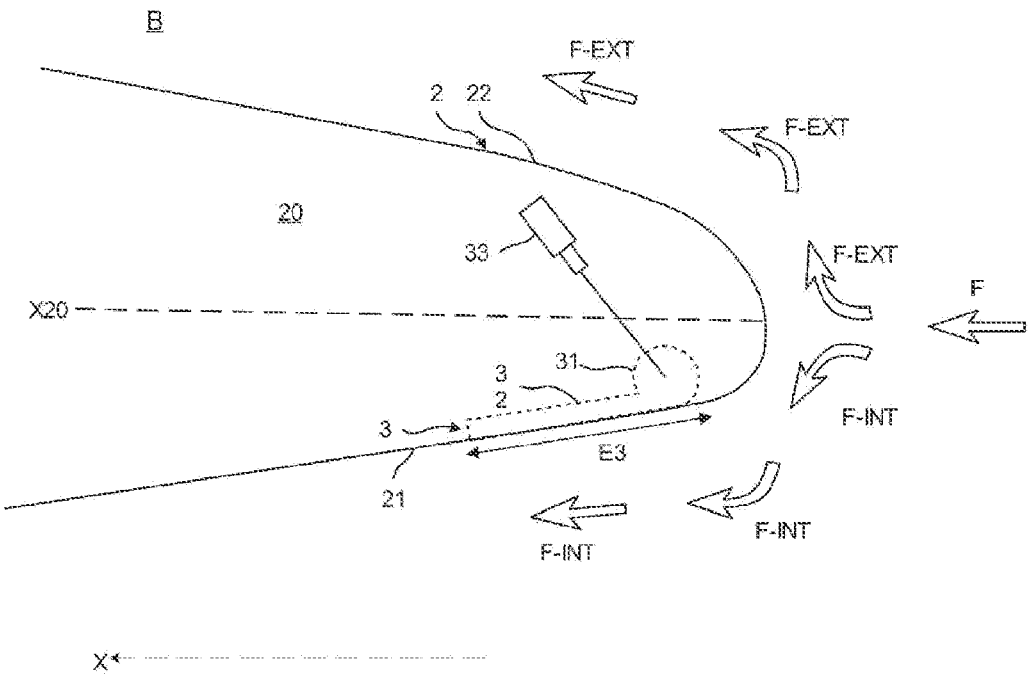
FIG. 7B are a schematic representation in a longitudinal cross-section view of an air intake comprising a deflection device, according to a first embodiment of the invention with an active moving member, in an extended position and a retracted position.

According to a first embodiment, with reference to FIGS. 7A and 7B, the deflection device comprises a row comprising a plurality of deflection members 3 positioned at the same radial distance from axis X. In this example, each deflection member 3 extends from the internal wall 21. Furthermore, in this example, each deflection member 3 comprises a proximal portion 31 rotatably hinged between the extended position A and the retracted position B and a distal portion 32 adapted to deflect the reverse air flow F-INV.

In this example, the distal portion 32 has a rectangular shape but of course other shapes could be suitable, especially a polygonal shape such as a trapezoidal shape. The trapezoidal shape has the advantage that with a single row of deflectors 3 of this type, the distal portions can cooperate together to continuously or substantially continuously cover the circumference of the air intake. The air flow is deflected over the entire circumference of the air intake. In other words, a staggered arrangement of the deflection members 3 is not necessary for the trapezoidal shape.

Preferably, since the fan 11 comprises fan vanes, the distal portion 32 has a length E3 less than ⅓ of the length of the fan vanes. Preferably, the proximal portion 31 is hinged at the internal wall 21 in the vicinity of the air intake lip 23.

In this example, as illustrated in FIG. 7A, the internal wall 21 comprises a concave housing 24, located upstream at the hinge axis with respect to the circulation direction of the reverse air flow F-INV and configured to receive the deflection member 3 in the retracted position B. As illustrated in FIG. 7B, in the retracted position B, the deflection member 3 extends as an extension of the internal wall 21 so that the air intake 2 has an aerodynamic profile.

In the example of FIG. 7A, the extension angle α formed between the longitudinal direction X20 of the annular cavity 20 and the extension direction X3, along which the deflection member 3 extends in the extended position A, is between 90° and 140°. It is thus chosen to be sufficiently low to promote separation D and sufficiently high so as not to significantly reduce forces involved in the reverse air flow F-INV. Its radially internal positioning makes it possible to act directly on the reverse air flow F-INV, which is advantageous.

As illustrated in FIG. 7A, in the extended position A, the reverse air flow F-INV generated by the fan 11 is guided by the internal wall 21 and then by the distal portion 32 of the deflection member 3 which moves the reverse air flow F-INV away from the air intake lip 23 in order to generate a separation D. This reduces the local vacuum exhibited in prior art, thereby improving the performance of the turbojet engine in the thrust reversal phase.

In this example, with reference to FIGS. 7A and 7B, the deflection device comprises a controllable active moving member 33 in order to move the deflection member 3 from the retracted position B to the extended position A. By way of example, this controllable active moving member 33 is in the form of a hydraulic, electric or other actuator in order to allow movement as a result of receiving a control command from a calculator. Preferably, the controllable active moving member 33 also allows the deflection member 3 to be moved from the extended position A to the retracted position B. Alternatively, the deflection member 3 can also be moved from the extended position A to the retracted position B passively under the effect of the internal air flow F-INT during the thrust phase.

It goes without saying that the deflection device 3 may comprise a plurality of controllable active moving members 33.

Figure 7C:
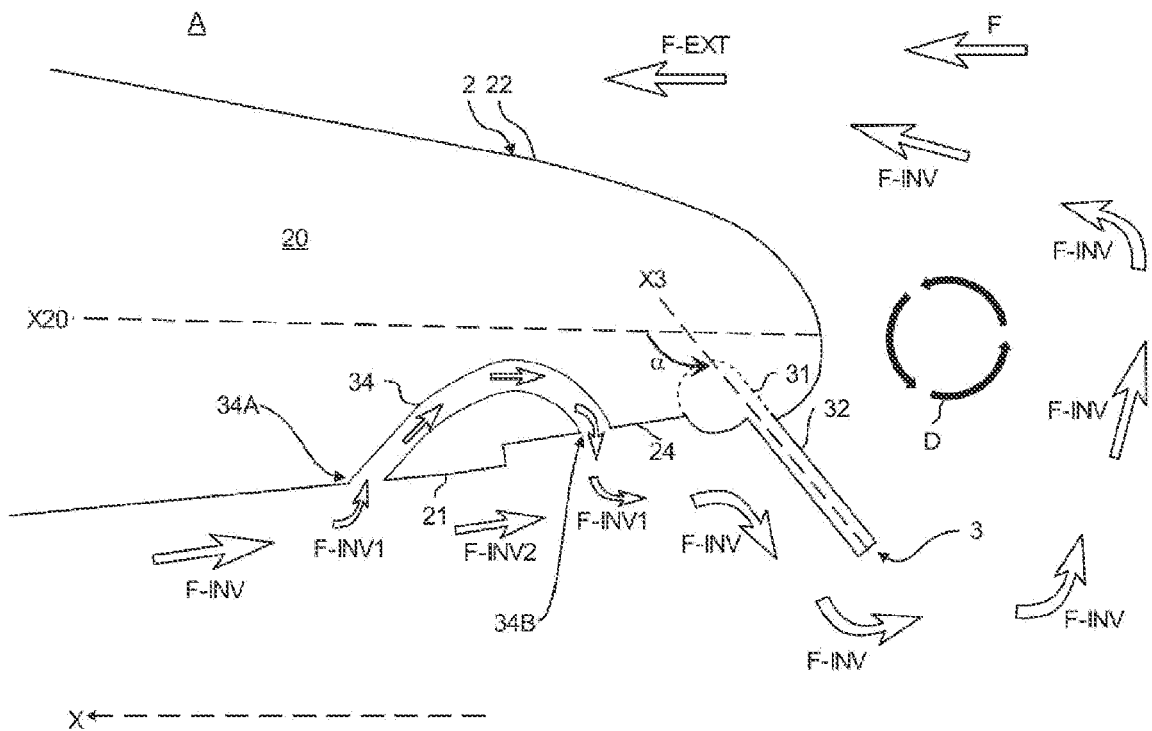
FIG. 7C.
Figure 7D:
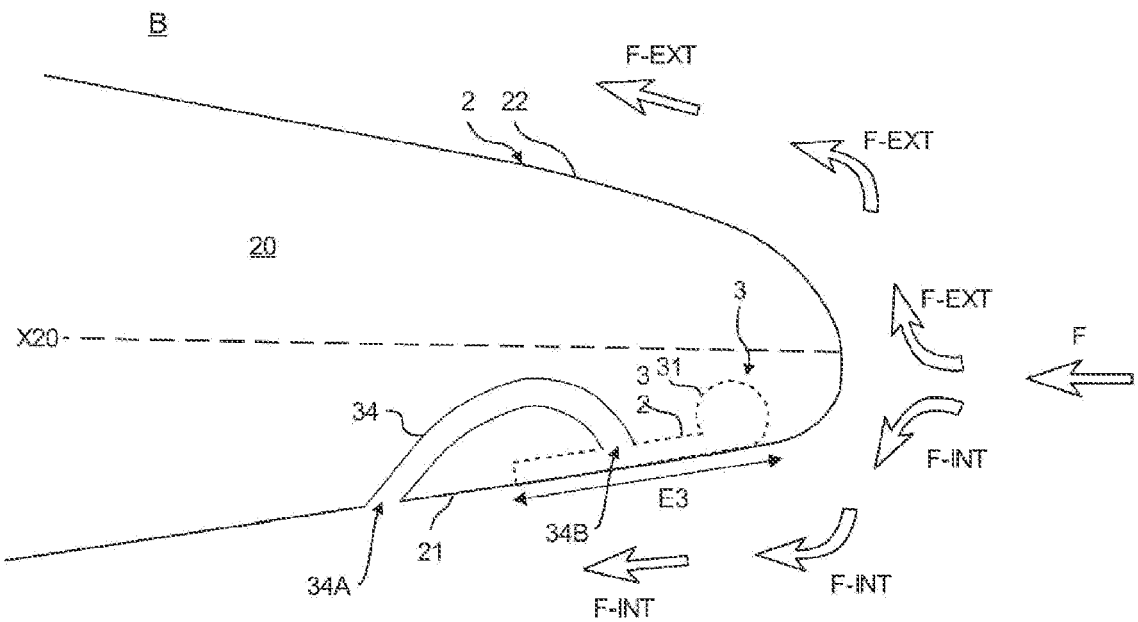
FIG. 7D are a schematic representation in a longitudinal cross-section view of an air intake comprising a deflection device, according to a first embodiment of the invention with passive moving member, in the extended position and in the retracted position.

According to another example, with reference to FIGS. 7C and 7D, the deflection device comprises a passive moving member 34 in order to move the deflection member 3 from the retracted position B to the extended position A without resorting to an actuator.

In the example shown in FIGS. 7C and 7D, the passive moving member 34 is in the form of a conduit formed in the annular cavity 20 of the air intake 2. Preferably, the conduit comprises an inlet 34A opening into the internal wall 21 and an outlet 34B opening onto the deflection member 3 in the retracted position B. More precisely, the inlet 34A is located downstream of the deflection member 3 with respect to the orientation of axis X. The inlet 34A can be located either upstream or downstream of the fan. The outlet 34B in turn opens into the concave housing 24. Advantageously, the conduit allows the deflection member 3 to be moved under the effect of the force generated by a part F-INV1 of the reverse air flow F-INV circulating in the passive moving member 34.

Advantageously, the passive moving member 34 does not need to be supplied with energy and uses that of the reverse air flow F-INV to be moved into the extended position A during the thrust reversal phase and that of the internal air flow F-INT to be moved into the retracted position B during the thrust phase.

It goes without saying that the passive moving member 34 could have a different structure. It also goes without saying that a deflection device may comprise a plurality of passive moving members 34. Furthermore, a deflection device may comprise one or more passive moving members 34 and one or more controllable active moving members 33.

Figure 8A:
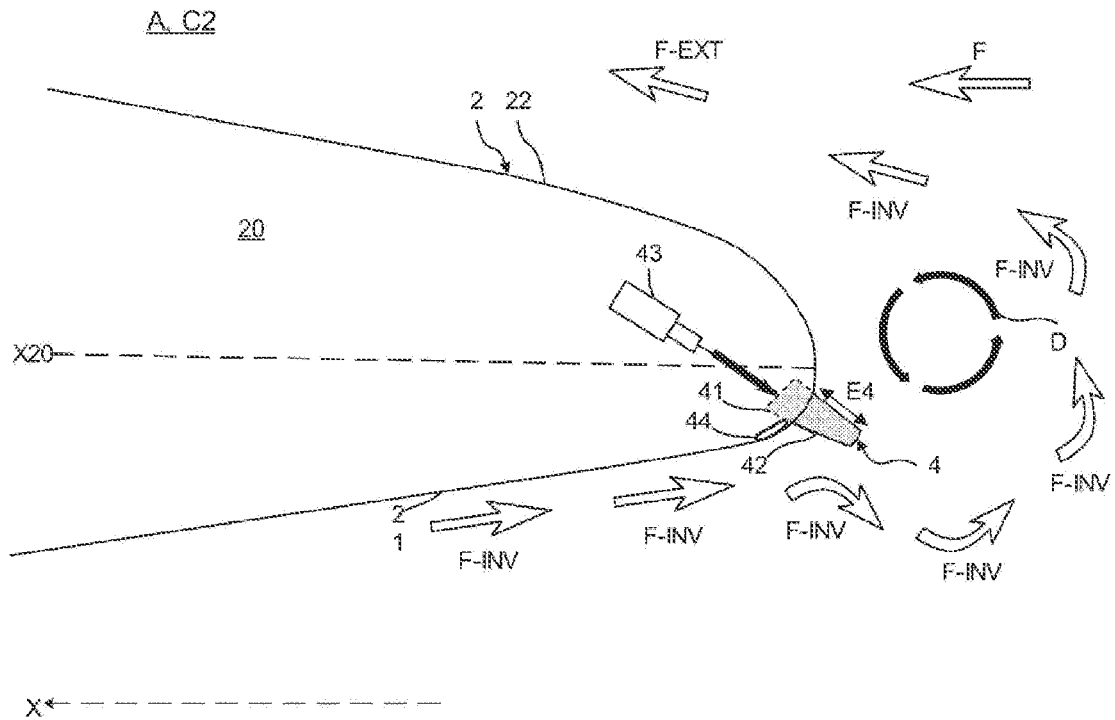
FIG. 8A.
Figure 8B:
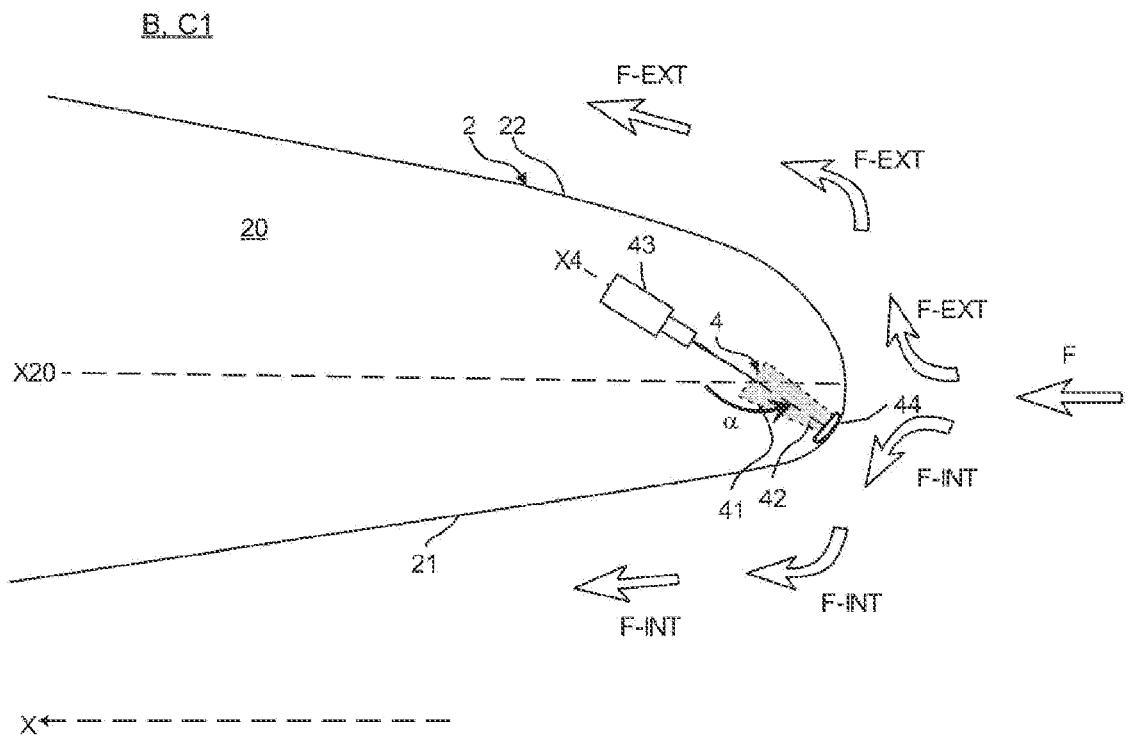
FIG. 8B are a schematic representation in a longitudinal cross-section view of an air intake comprising a deflection device, according to a second embodiment of the invention, in the extended position and in the retracted position.
Figure 8C:
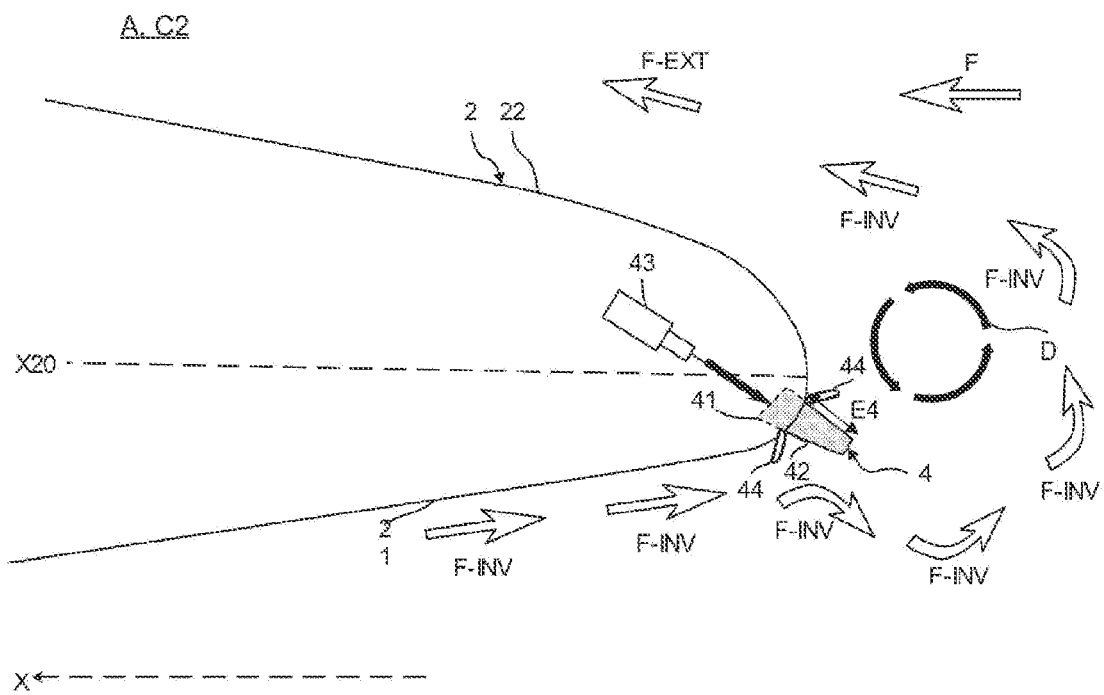
FIG. 8C is a schematic representation in a longitudinal cross-section view of an air intake comprising a deflection device in the retracted position with another cover member.

According to a second embodiment illustrated in FIGS. 8A, 8B, and 8C, a plurality of deflection members 4 that are translationally moved along the extension direction X4 are represented.

Preferably, the deflection members 4 have a polygonal, preferably trapezoidal, shape in order to have a high mechanical strength to oppose the reverse air flow F-INV. Analogously to the foregoing, each deflection member 4 extends from the internal wall 21 and has a proximal portion 41 and a distal air deflection portion 42. The proximal portion 41 extends into the annular cavity 20 while the distal portion 42 projectingly extends of the annular cavity 20 along a radially internal extension direction X4 pointing to axis X. Preferably, the length E4 of the distal portion 42 is less than ⅓ of the length of the fan vanes.

According to another aspect of the invention with reference to FIGS. 8A to 8C, the deflection device 4 comprises a cover member 44 movably mounted between a covered position C1, in which the cover member 44 covers the deflection member 4 in the retracted position B so as to provide an aerodynamic profile (FIG. 8B), and an uncovered position C2, in which the cover member 44 is offset from its covered position C1 (FIGS. 8A and 8C) so that the deflection member 4 is in the extended position A.

Preferably, the cover member 44 is made of a rigid material. Preferably, the cover member 44 is made of a material identical to the internal wall 21 and its shape is selected to be as an extension of the internal wall 21 so that the aerodynamic profile of the air intake 2 remains unchanged during the thrust phase.

In the example of FIG. 8A, the cover member 44 is translationally moved along the internal wall 21 inwardly, from the covered position C1 to the uncovered position C2. In the example of FIG. 8C, the cover member 44 comprises two parts positioned radially inwardly and radially outwardly of the deflection member 4 and rotatably hinged upstream of the air intake 2. However, it goes without saying that the cover member 44 could have other shapes and be moved in different ways. Furthermore, the cover member 44 may comprise one or more parts. Furthermore, the movement of the cover member 44 may be achieved by a controllable active moving member 43 and/or by a passive moving member or by any other moving member.

Figure 9A:
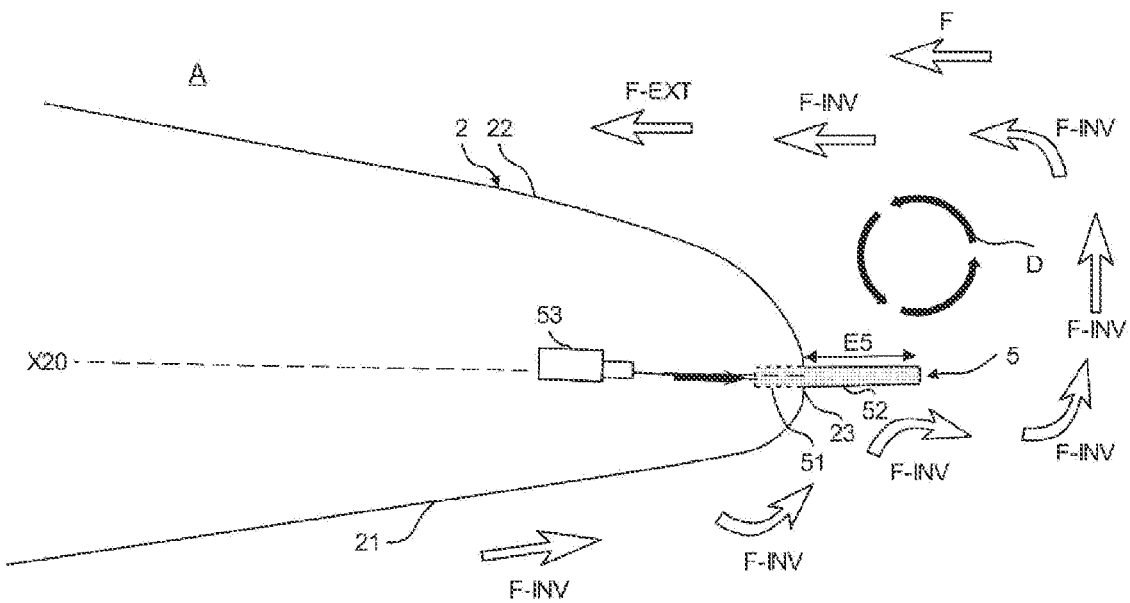
FIG. 9A.
Figure 9B:
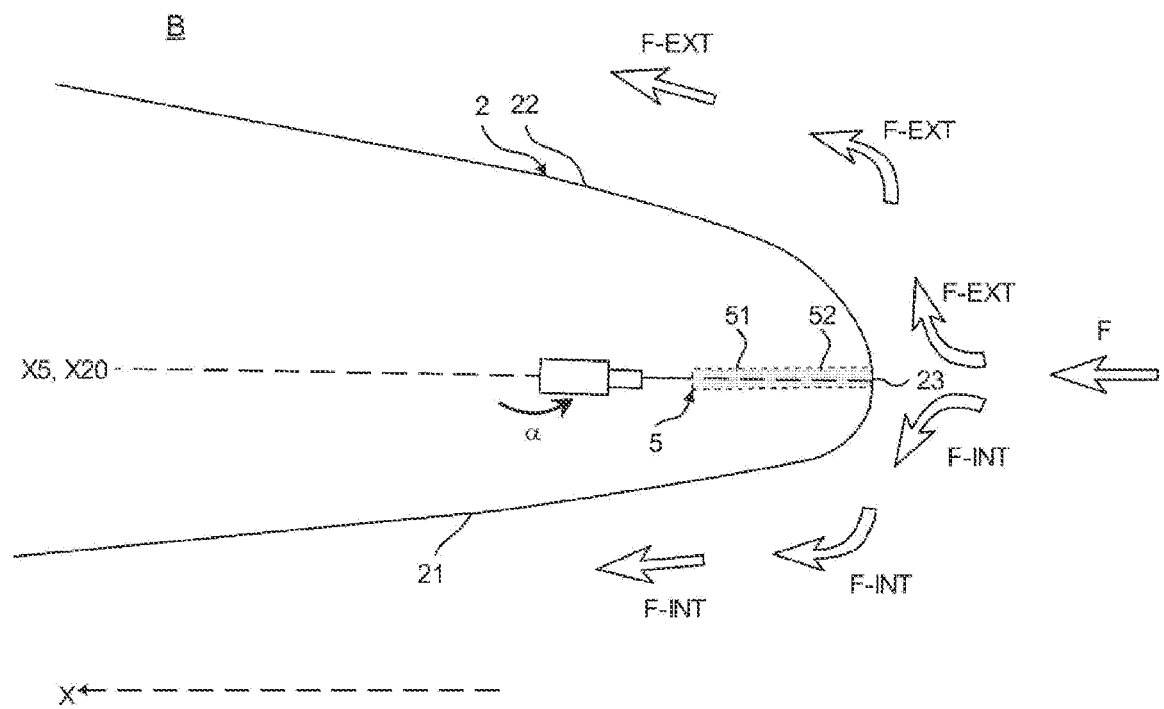
FIG. 9B are a schematic representation in a longitudinal cross-section view of an air intake comprising a deflection device, according to a third embodiment of the invention, in the extended position and the retracted position.

According to a third embodiment illustrated in FIGS. 9A and 9B, the deflection device comprises a single deflection member 5 circumferentially extending about axis X. Advantageously, the reverse air flow F-INV is deflected over the entire circumference of the air intake 2.

According to another aspect of the invention and as illustrated in FIGS. 9A and 9B, the deflection member 5 has a cylindrical shape and extends from the air intake lip 23 along an extension direction X5 substantially longitudinal to axis X. Preferably, the deflection member 5 allows the air intake lip 23 to be extended and thus to be reduced in thickness, thus promoting a separation D of the reverse air flow F-INV. Preferably, the deflection member 5 extends over a length E5 less than ⅓ of the length of the fan vanes.

Three particular embodiments of the invention have been described by way of example, but it goes without saying that the invention is not defined solely by these embodiments. Indeed, the invention encompasses any possible combination of the different technical characteristics of the embodiments set forth.

In particular, all three embodiments described have a deflection device for deflecting the reverse air flow F-INV homogeneously at the circumference of the air intake 2. However, under some operating conditions, such as braking, it may be advantageous to deflect this reverse air flow F-INV heterogeneously. Thus, various examples are described below with reference to FIGS. 10A to 10C for heterogeneously deflecting the reverse air flow F-INV.

Figure 10A:
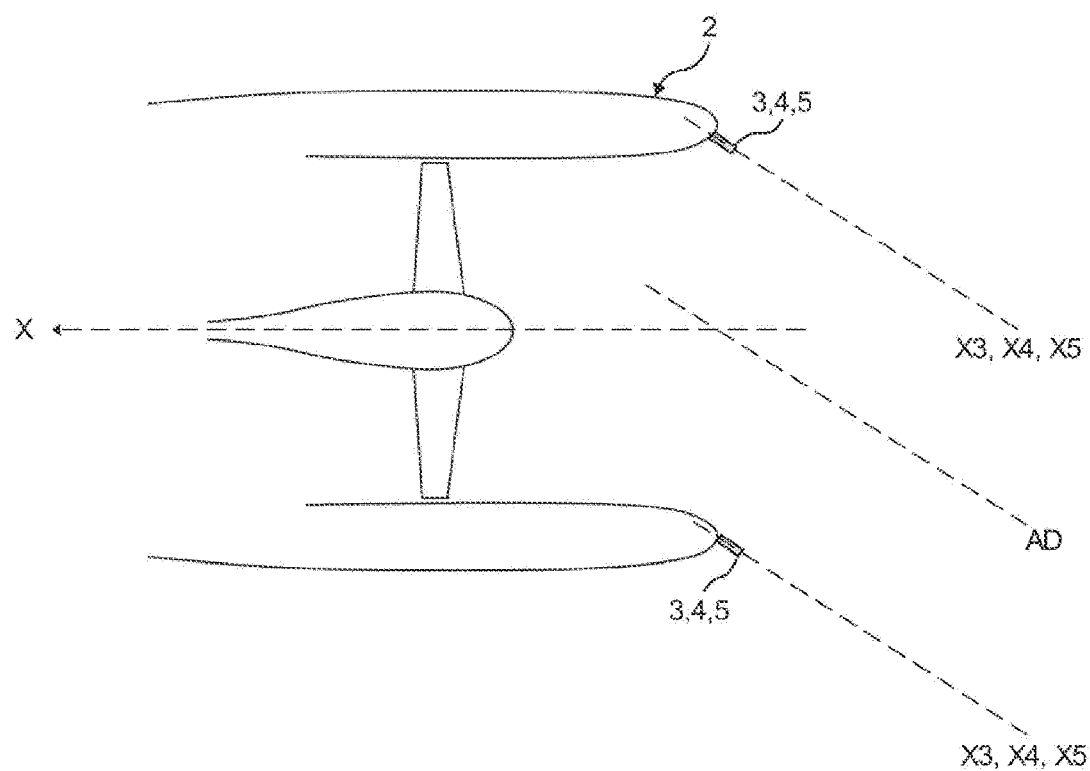
FIG. 10A.
Figure 10B:
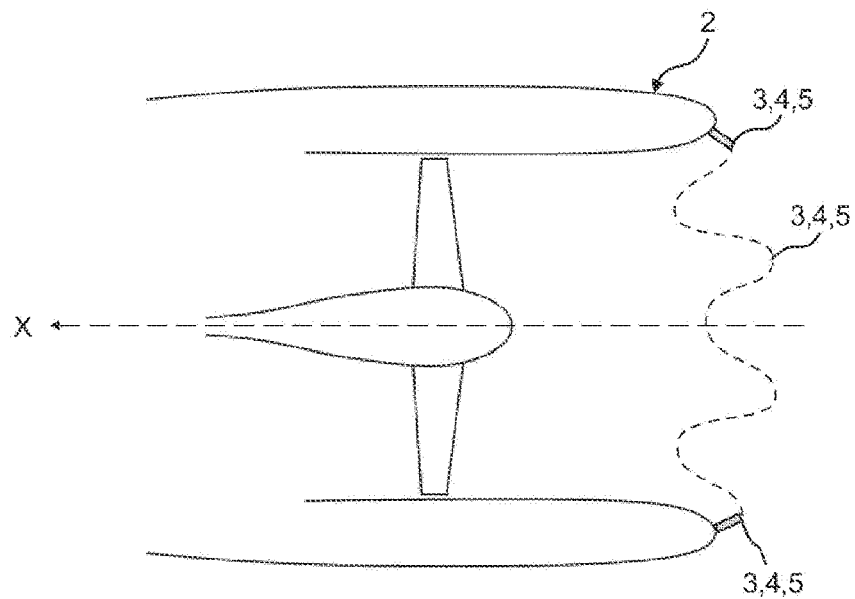
FIG. 10B are a schematic representation in a longitudinal cross-section view of a turbojet engine nacelle allowing heterogeneous thrust reversal phase, according to the invention.
Figure 10C:
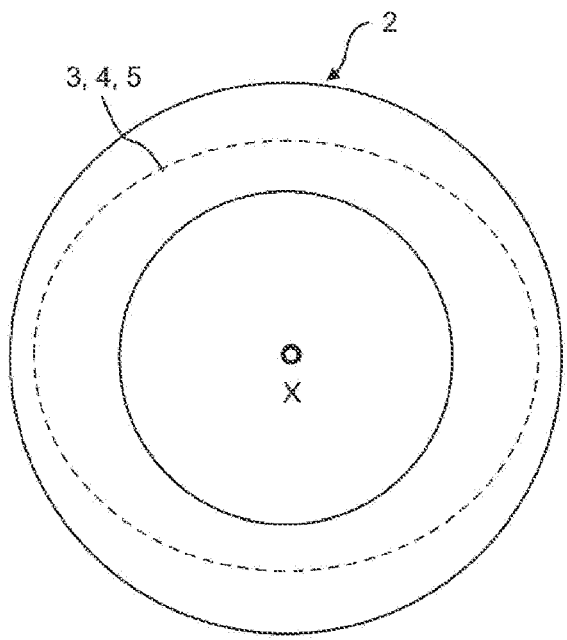
FIG. 10C is a schematic representation in a transverse cross-section view of an air intake allowing heterogeneous thrust reversal phase, according to the invention.

As illustrated in FIG. 10A, a deflection member 3, 4, 5 can be oriented along different directions at the circumference of the air intake 2 so as to form an air intake lip oriented along a predetermined deformation axis AD. Alternatively, the deflection members 3, 4, 5 may extend along different projecting lengths at the circumference of the air intake 2, as illustrated in FIG. 10B. Furthermore, with reference to FIG. 10C, the deflection members 3, 4, 5 may form an elliptical-, in particular ovoid-shaped, row over the circumference of the air intake 2, in a plane transverse to axis X. In the case of a single deflection member 3, 4, 5, this can take the form of an elliptical belt in a plane transverse to axis X. A heterogeneous deflection advantageously makes it possible to guide the reverse air flow taking account of the environment of the air intake 2.

A method for operating the air intake 2 according to the invention previously set forth is described hereinafter.

During the thrust phase, the fan 11 makes it possible to accelerate an internal air flow F-INT which is guided by the air intake 2 having an aerodynamic profile promoting the thrust phase. The deflection member 3, 4, 5 is in the retracted position B during the thrust phase of the turbojet engine 1, so that the air intake 2 has an aerodynamic profile so as to guide the air flow.

During a thrust reversal phase of said turbojet engine 1, in particular following a change in the pitch of the fan vanes 11, the method comprises a step of moving the deflection member 3, 4, 5 from the retracted position B to the extended position A, during which, the deflection member 3, 4, 5 is extended so as to projectingly extend from the internal wall 21 or the air intake lip 23 along the radially internal extension direction X3, X4 pointing to axis X or the longitudinal extension direction X5 relative to axis X, promoting the thrust reversal phase. Advantageously, this movement step imparts to the aircraft a good performance both in the thrust phase, where the internal air flow F-INT is kept unchanged, and in the thrust reversal phase, where the deflection member 3, 4, 5 generates a separation D of the reverse air flow F-INV from the internal wall 21.

According to one aspect of the invention, only part of the deflection members 3, 4, 5 are moved during the movement step to adapt to different operating conditions, such as braking.

According to one aspect of the invention, the step of moving the deflection member 3, 4, 5 is performed by means of the controllable active moving device 33, 43 in a simple and quick manner. According to another aspect of the invention, the step of moving the deflection member 3, 4, 5 is performed by means of the passive movement device 34, judiciously using the force of the reverse air flow F-INV to move the deflection member 3, 4, 5 to the extended position A. Preferably, the passive movement device 34 uses the force of the internal air flow F-INT to move the deflection member 3, 4, 5 to the retracted position B.

Preferably, the operating method comprises a step of reversely moving the deflection member 3, 4, 5 from the extended position A to the retracted position B, during which, with the deflection member 3, 4, 5 initially extended in order to projectingly extend from the internal wall 21 or air intake lip 23 along the upstream and radially internal extension direction X3, X4 pointing to axis X or the longitudinal extension direction X5 relative to axis X promoting the thrust reversal phase, the deflection member 3, 4, 5 is moved so that the air intake 2 has an aerodynamic profile promoting the thrust phase. This movement can be carried out actively or passively.

By virtue of the invention, the performance of the turbojet engine 1 is significantly improved during the thrust reversal phase while maintaining the existing performance during the thrust phase. In fact, the deflection member 3, 4, 5 generates, in the extended position A, a separation D of the reverse air flow F-INV from the internal wall 21, making it possible to orient said reverse air flow F-INV in a substantially axial direction with an opposite sense to the upstream air flow F, originating the thrust reversal phase, while generating reduced weight and drag. In the retracted position B, the air intake 2 advantageously maintains its aerodynamic profile.

The invention claimed is:

1. An aircraft turbojet engine extending along an axis X and oriented from upstream to downstream in which an internal air flow circulates from upstream to downstream during a thrust phase and a reverse air flow from downstream to upstream during a thrust reversal phase, said turbojet engine comprising:
   a fan configured to provide reverse thrust;
   a nacelle comprising an air intake, the air intake circumferentially extending about the axis X and comprising an internal wall pointing to the axis X and configured to guide the internal air flow and the reverse air flow, and an external wall opposite to the internal wall and configured to guide an external air flow, the internal wall and the external wall being connected to each other by an air intake lip so as to form an annular cavity, wherein the air intake further comprising:
      a deflection device comprising at least one deflection member movably mounted between an extended position, in which the at least one deflection member projectingly extends from the internal wall or from the air intake lip in a radially internal extension direction pointing to the axis X or in a longitudinal extension direction relative to the axis X in order to allow a separation of the reverse air flow from the internal wall to promote the thrust reversal phase, and a retracted position, in which the air intake has an aerodynamic profile so as to guide the internal air flow onto the internal wall to promote the thrust phase;
   wherein the at least one deflection member is translationally mounted between the extended position and the retracted position; and
   wherein the deflection device comprises a single deflection member circumferentially extending about the axis X.

2. The aircraft turbojet engine according to claim 1, wherein the extension direction is oriented upstream.

3. The aircraft turbojet engine according to claim 1, wherein the annular cavity extends along a longitudinal direction X20 that substantially parallel to the axis X and the extension direction forms an extension angle with respect to the longitudinal direction X20 that is between 90° and 140°.

4. The aircraft turbojet engine according to claim 1, wherein the deflection device comprises at least one controllable active moving member configured to move the at least one deflection member from the retracted position to the extended position.

5. A method for operating the aircraft turbojet engine according to claim 1, the method comprising, during a thrust reversal phase of said turbojet, a step of moving the at least deflection member into an extended position so that said at least one deflection member projectingly extends from the internal wall or from the air intake lip along a radially internal extension direction pointing to the axis X or a longitudinal extension direction relative to the axis X to separate the reverse air flow from the internal wall to promote the thrust reversal phase.

6. An aircraft turbojet engine extending along an axis X and oriented from upstream to downstream in which an internal air flow circulates from upstream to downstream during a thrust phase and a reverse air flow from downstream to upstream during a thrust reversal phase, said turbojet engine comprising:
   a fan configured to provide reverse thrust;
   a nacelle comprising an air intake, the air intake circumferentially extending about the axis X and comprising an internal wall pointing to the axis X and configured to guide the internal air flow and the reverse air flow, and an external wall opposite to the internal wall and configured to guide an external air flow, the internal wall and the external wall being connected to each other by an air intake lip so as to form an annular cavity, wherein the air intake further comprising:
      a deflection device comprising at least one deflection member movably mounted between an extended position, in which the at least one deflection member projectingly extends from the internal wall or from the air intake lip in a radially internal extension direction pointing to the axis X or in a longitudinal extension direction relative to the axis X in order to allow a separation of the reverse air flow from the internal wall to promote the thrust reversal phase, and a retracted position, in which the air intake has an aerodynamic profile so as to guide the internal air flow onto the internal wall to promote the thrust phase; and
   wherein the deflection device comprises at least one passive moving member configured to move the at least one deflection member from the retracted position to the extended position by action of the reverse air flow.

7. The aircraft turbojet engine according to claim 6, wherein the deflection device comprises a plurality of deflection members distributed at the air intake about the axis X.

8. The aircraft turbojet engine according to claim 6, wherein the deflection device comprises at least one row comprising a plurality of deflection members positioned at a same radial distance from the axis X.

9. A method for operating the aircraft turbojet engine according to claim 6, the method comprising, during a thrust reversal phase of said turbojet, a step of moving the at least deflection member into an extended position so that said at least one deflection member projectingly extends from the internal wall or from the air intake lip along a radially internal extension direction pointing to the axis X or a longitudinal extension direction relative to the axis X to separate the reverse air flow from the internal wall to promote the thrust reversal phase.

10. An aircraft turbojet engine extending along an axis X and oriented from upstream to downstream in which an internal air flow circulates from upstream to downstream during a thrust phase and a reverse air flow from downstream to upstream during a thrust reversal phase, said turbojet engine comprising:

a fan configured to provide reverse thrust;

a nacelle comprising an air intake, the air intake circumferentially extending about the axis X and comprising an internal wall pointing to the axis X and configured to guide the internal air flow and the reverse air flow, and an external wall opposite to the internal wall and configured to guide an external air flow, the internal wall and the external wall being connected to each other by an air intake lip so as to form an annular cavity, wherein the air intake further comprising:

a deflection device comprising at least one deflection member movably mounted between an extended position, in which the at least one deflection member projectingly extends from the internal wall or from the air intake lip in a radially internal extension direction pointing to the axis X or in a longitudinal extension direction relative to the axis X in order to allow a separation of the reverse air flow from the internal wall to promote the thrust reversal phase, and a retracted position, in which the air intake has an aerodynamic profile so as to guide the internal air flow onto the internal wall to promote the thrust phase; and wherein the deflection device comprises a cover member movably mounted between a covered position, in which said cover member covers the at least one deflection member in the retracted position so as to provide an aerodynamic profile, and an uncovered position, in which said cover member is offset from the covered position so as to bring the at least one deflection member to the extended position.

11. A method for operating the aircraft turbojet engine according to claim 10, the method comprising, during a thrust reversal phase of said turbojet, a step of moving the at least deflection member into an extended position so that said at least one deflection member projectingly extends from the internal wall or from the air intake lip along a radially internal extension direction pointing to the axis X or a longitudinal extension direction relative to the axis X to separate the reverse air flow from the internal wall to promote the thrust reversal phase.

* * * * *